US012020666B2

(12) United States Patent
Aogaki et al.

(10) Patent No.: US 12,020,666 B2
(45) Date of Patent: Jun. 25, 2024

(54) SYSTEM AND METHOD FOR VARIABLE AREA-BASED COMPENSATION OF BURN-IN IN DISPLAY PANELS

(71) Applicant: Synaptics Incorporated, San Jose, CA (US)

(72) Inventors: Kazutoshi Aogaki, Kanagawa (JP); Takashi Nose, Kanagawa (JP); Hirobumi Furihata, Tokyo (JP)

(73) Assignee: Synaptics Incorporated, San Jose, CA (US)

( * ) Notice: Subject to any disclaimer, the term of this patent is extended or adjusted under 35 U.S.C. 154(b) by 152 days.

(21) Appl. No.: 17/876,780

(22) Filed: Jul. 29, 2022

(65) Prior Publication Data

US 2023/0102440 A1 Mar. 30, 2023

Related U.S. Application Data

(60) Provisional application No. 63/248,394, filed on Sep. 24, 2021.

(51) Int. Cl.
*G09G 5/10* (2006.01)

(52) U.S. Cl.
CPC ....... *G09G 5/10* (2013.01); *G09G 2320/0233* (2013.01); *G09G 2320/0276* (2013.01); *G09G 2320/0285* (2013.01); *G09G 2320/046* (2013.01); *G09G 2360/16* (2013.01)

(58) Field of Classification Search
CPC ............. G09G 5/10; G09G 2320/0233; G09G 2320/0276; G09G 2320/0285; G09G 2320/046; G09G 2360/16
See application file for complete search history.

(56) References Cited

U.S. PATENT DOCUMENTS

| | | | | |
|---|---|---|---|---|
| 11,620,933 | B2 * | 4/2023 | Orio | G09G 3/3291 345/204 |
| 11,721,285 | B2 * | 8/2023 | Liu | G09G 3/3258 345/204 |
| 11,869,456 | B2 * | 1/2024 | Kim | H04N 23/57 |

* cited by examiner

*Primary Examiner* — Rodney Amadiz
(74) *Attorney, Agent, or Firm* — Leydig, Voit & Mayer, Ltd.

(57) ABSTRACT

A display driver that includes image processing circuitry and a source driver. The image processing circuitry is configured to perform a burn-in compensation to determine a first compensated luminance value for a first pixel in a first area of a display panel based at least in part on a first accumulated luminance value for the first pixel. The first area has a first pixel layout. The image processing circuitry is further configured to scale a second accumulated luminance value for a second pixel in a second area of the display panel to determine a scaled accumulated luminance value. The second area has a second pixel layout different from the first pixel layout. The image processing circuitry is further configured to perform a burn-in compensation to determine a second compensated luminance value for the second pixel based at least in part on the scaled accumulated luminance value.

20 Claims, 12 Drawing Sheets

SYSTEM AND METHOD FOR VARIABLE AREA-BASED COMPENSATION OF BURN-IN IN DISPLAY PANELS

CROSS REFERENCE TO RELATED APPLICATIONS

This application is a non-provisional application of, and therefore, claims benefit under 35 U.S.C. 119(e), to U.S. Patent Application Ser. No. 63/248,394 filed on Sep. 24, 2021. U.S. Patent Application Ser. No. 63/248,394 is incorporated by reference in its entirety.

FIELD

This disclosure relates generally to the field of display panels, specifically to compensating for effects of burn-in.

BACKGROUND

Display devices such as organic light emitting diode (OLED) displays, micro light emitting diode (LED) displays, and liquid crystal displays (LCD) may be susceptible to burn-in artifacts from overuse of pixel elements. These burn-in artifacts are dependent upon lifetime use of the individual pixels in the panel. Pixels which see heavy use may degrade faster than pixels which see limited use. A unique pixel compensation may be added to compensate for burn-in. An onboard memory may store the long-term usage data for each pixel. Compensation may add a large gain factor for pixels which have seen heavy use, and a smaller gain factor for pixels which have seen little use.

Modern display systems may be provided with imaging elements, such as cameras, under the display. Pixels which are placed above these imaging elements may be arranged in a different pixel layout relative to pixels in other areas to allow sufficient light to pass through the pixels and reach the imaging element. In this case, those pixels above the imaging element may be driven with a brighter signal to keep the display uniform. This may cause more rapid degradation for pixels placed above an imaging element than for pixels in other areas of the display.

There is a need for a burn-in compensation system and method which compensates for pixels placed above imaging elements differently than pixels in other areas of the display.

SUMMARY

This summary is provided to introduce in a simplified form a selection of concepts that are further described below in the detailed description. This summary is not intended to identify key features or essential features of the claimed subject matter, nor is it intended to limit the scope of the claimed subject matter.

In general, in one aspect, one or more embodiments relate to a display driver that includes image processing circuitry and a source driver. The image processing circuitry is configured to perform a burn-in compensation to determine a first compensated luminance value for a first pixel in a first area of a display panel based at least in part on a first accumulated luminance value for the first pixel. The first area has a first pixel layout. The image processing circuitry is further configured to scale a second accumulated luminance value for a second pixel in a second area of the display panel to determine a scaled accumulated luminance value. The second area has a second pixel layout different from the first pixel layout. The image processing circuitry is further configured to perform a burn-in compensation to determine a second compensated luminance value for the second pixel based at least in part on the scaled accumulated luminance value. The source driver is configured to update the first pixel based at least in part on the first compensated luminance value, and update the second pixel based at least in part on the second compensated luminance value.

In one or more embodiments, long-term accumulated luminance of display pixels may be recorded in a memory device. Output grey scale levels to a display panel may be compensated based on accumulated luminance values and the burn-in profile of a specific display panel. In one or more embodiments, different compensation values may be used for areas of a display panel using pixels of different densities or compositions.

In general, in one aspect, one or more embodiments relate to a display device that includes a display panel and a display driver. The display panel includes a first area with a first pixel layout and a second area with a second pixel layout different from the first pixel layout. The display driver is configured to perform a burn-in compensation to determine a first compensated luminance value for a first pixel in the first area of the display panel based at least in part on a first accumulated luminance value for the first pixel. The display driver is further configured to scale a second accumulated luminance value for a second pixel in the second area of the display panel to determine a scaled accumulated luminance value. The display driver is further configured to perform a burn-in compensation to determine a second compensated luminance value for the second pixel based at least in part on the scaled accumulated luminance value. The display driver is further configured to update the first pixel based at least in part on the first compensated luminance value and update the second pixel based at least in part on the second compensated luminance value.

In general, in one aspect, one or more embodiments relate to a method for driving a display panel that includes a first area and a second area. The first area has a first pixel layout and the second area has a second pixel layout different from the first pixel layout. The method includes performing a burn-in compensation to determine a first compensated luminance value for a first pixel in the first area of the display panel based at least in part on a first accumulated luminance value for the first pixel. The method further includes scaling a second accumulated luminance value for a second pixel in the second area of the display panel to determine a scaled accumulated luminance value. The method further includes performing a burn-in compensation to determine a second compensated luminance value for the second pixel based at least in part on the scaled accumulated luminance value. The method further includes updating the first pixel based at least in part on the first compensated luminance value and updating the second pixel based at least in part on the second compensated luminance value.

Other aspects of the embodiments will be apparent from the following description and the appended claims.

BRIEF DESCRIPTION OF DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments, and are therefore not to be considered limiting of inventive scope, as the disclosure may admit to other equally effective embodiments.

Figure 1A:
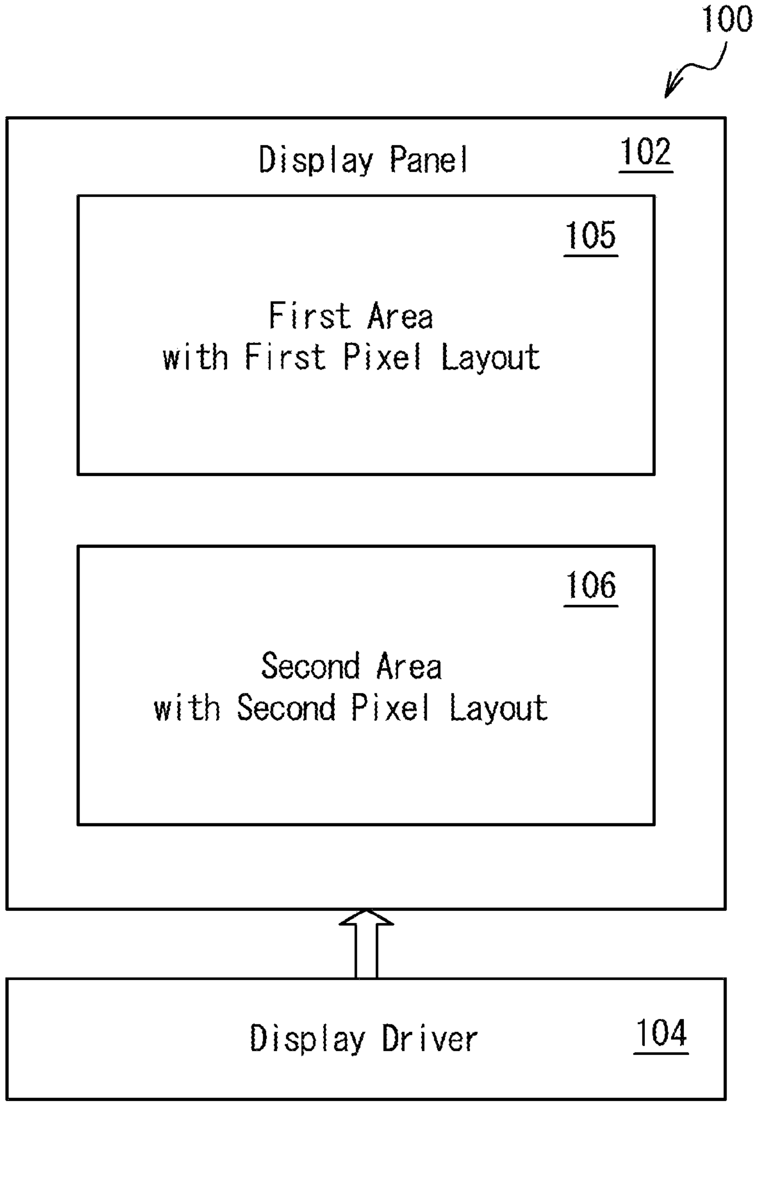
FIG. 1A shows an example configuration of a display device that includes a display panel including multiple areas with different pixel layouts, according to one or more embodiments.

To facilitate understanding, identical reference numerals have been used, where possible, to designate identical elements that are common to the figures. It is contemplated that elements disclosed in one embodiment may be beneficially utilized in other embodiments without specific recitation. Suffixes may be attached to reference numerals for distinguishing identical elements from each other. The drawings referred to herein should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature, and is not intended to limit the disclosed technology or the application and uses of the disclosed technology. Furthermore, there is no intention to be bound by any expressed or implied theory presented in the preceding technical field, background, or the following detailed description.

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Display devices such as OLED displays, micro LED displays, and LCDs may be susceptible to burn-in artifacts from overuse of pixels. These burn-in artifacts are dependent upon how much use the individual pixels have in the panel over the course of the pixel's lifetime. Pixels which have heavy use may degrade faster than the pixels which have limited use. The accumulated luminance values of individual pixels may be used to compensate for burn-in.

Areas of the display may include pixels of different pixel layouts which may have different long-term burn-in profiles. The pixel layout difference may include a difference in one or more of the pixel density (which may be measured as pixel-per-inch (PPI)), composition, size, and arrangement. For example, pixels in a lower pixel density may each have greater use to compensate for the lower density. The result is a greater risk of burn-in artifact as compared to pixels in a higher density region. A given display panel may be characterized for the degradation of pixel elements and a compensation applied to the display to correct for long-term degradation in different areas of the display.

FIG. 1A shows an example configuration of a display device 100 that includes a display panel 102 including multiple areas with different pixel layouts, according to one or more embodiments. Examples of the display panel 102 include an OLED display panel, a micro LED display panel, and an LCD panel. In the shown embodiment, the display panel 102 includes a first area 105 with a first pixel layout and a second area 106 with a second pixel layout different from the first pixel layout. Although only two areas are shown, more than two areas may exist without departing from the scope of one or more embodiments. The display panel 102 may be connected to a display driver 104 configured to update the display panel 102.

Figure 1B:
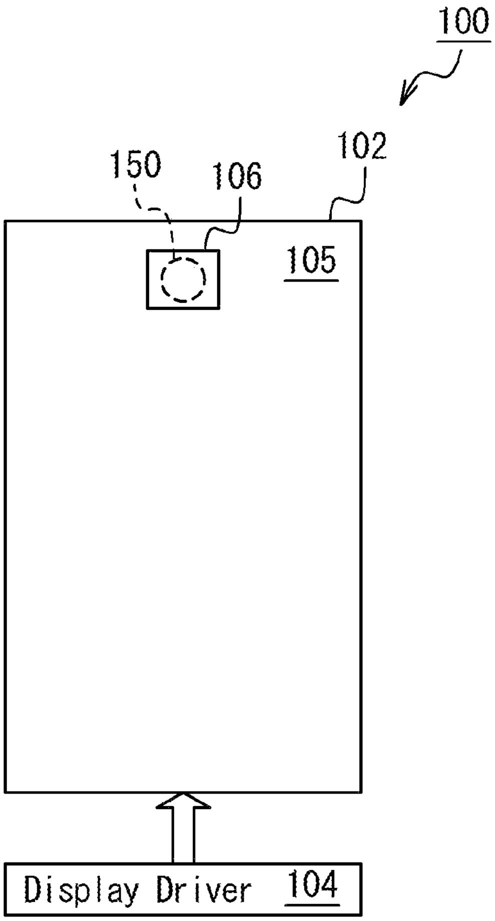
FIG. 1B shows an example configuration of a display panel, according to one or more embodiments.

The shapes and/or arrangement of the first and second areas 105 and 106 of the display panel 102 may be variously modified. FIG. 1B shows another example configuration of the display panel 102, according to one or more embodiments. In the shown embodiment, the second area 106 is a rectangular area defined on the display panel 102 and the first area 105 is defined as the remaining area. The second area 106 may be used as an under display camera (UDC) area behind which a UDC 150 is disposed to capture an image through the UDC area. In such embodiments, the second area 106 may have a lower pixel density than that of the first area 105.

Figure 1C:
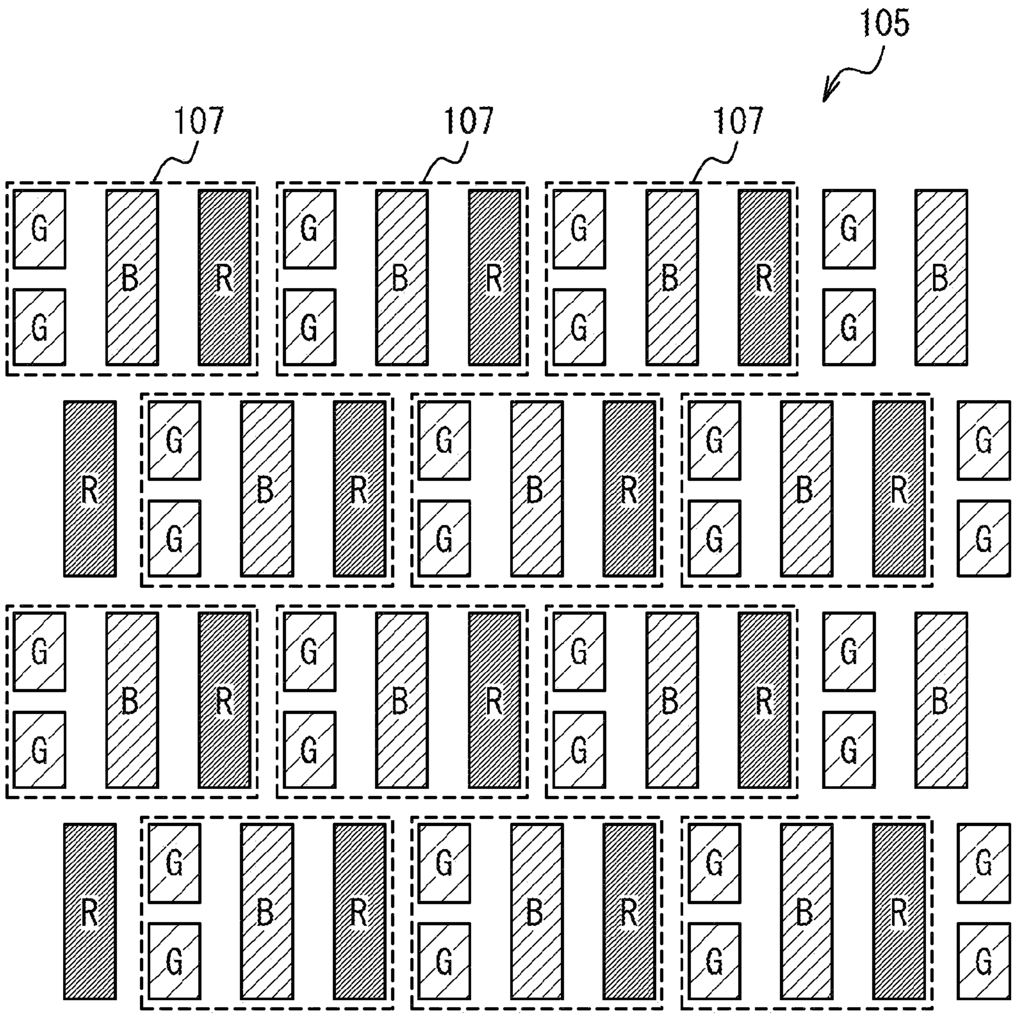
FIG. 1C shows an example pixel layout in a first area of the display panel, according to one or more embodiments.

FIG. 1C shows an example pixel layout in the first area 105, according to one or more embodiments. In the shown embodiment, the first area 105 may include pixel sets 107 each including a red (R) pixel, two green (G) pixels, and a blue (B) pixel. In FIG. 1C (and in FIG. 1D), "R", "G", and "B" denote red pixels, green pixels, and blue pixels, respectively. The R, G, and B pixels of the pixel sets 107 are each configured to be updated with a data signal received from the display driver 104 and emit light of luminance corresponding to the data signal.

Figure 1D:
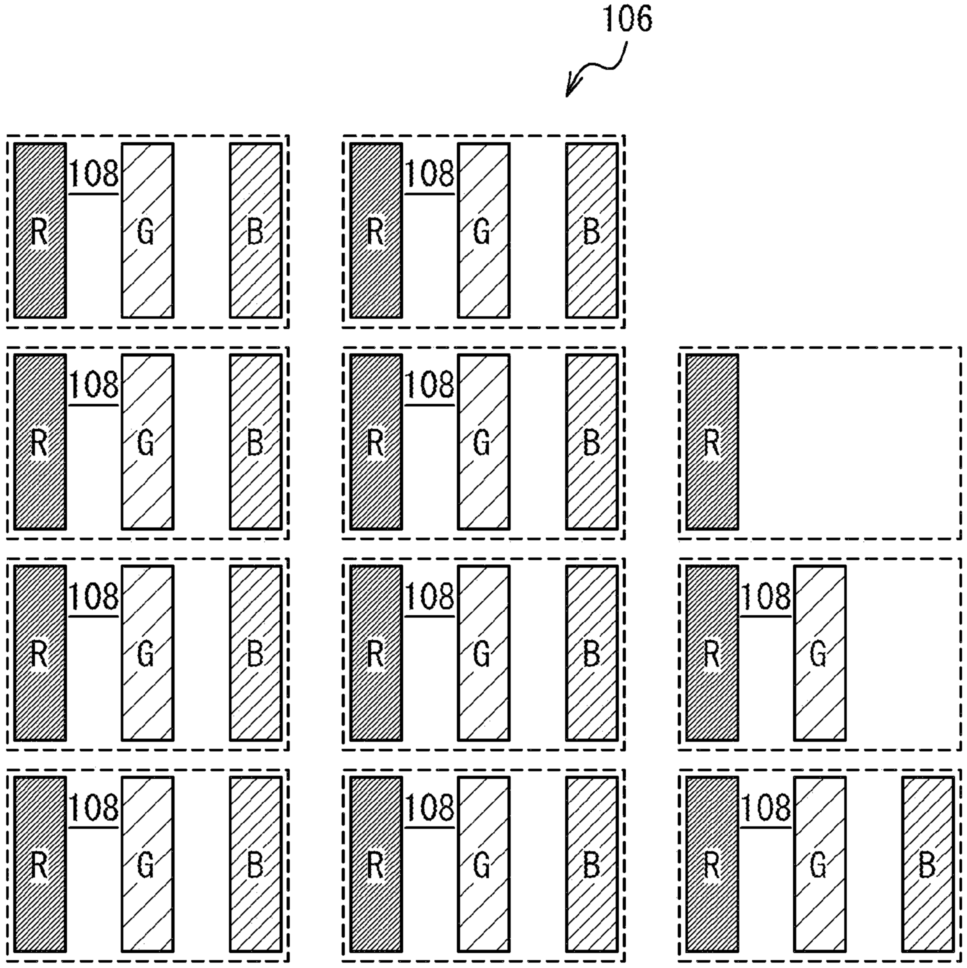
FIG. 1D shows an example pixel layout in a second area of the display panel, according to one or more embodiments.

FIG. 1D shows an example pixel layout in the second area 106, according to one or more embodiments. In the illustrated embodiment, the second area 106 may include a plurality of pixel sets 108 each including one R pixel, one G pixel, and one B pixel. The pixels are arranged such that the pixel density in the second area 106 is lower than that in the first area 105. In one implementation, the spacing between two adjacent pixels in the second area 106 is larger than that in the first area 105. The R, G, and B pixels of the pixel sets 108 are each configured to be updated with a data signal received from the display driver 104 and emit light of luminance corresponding to the data signal.

Figure 1E:
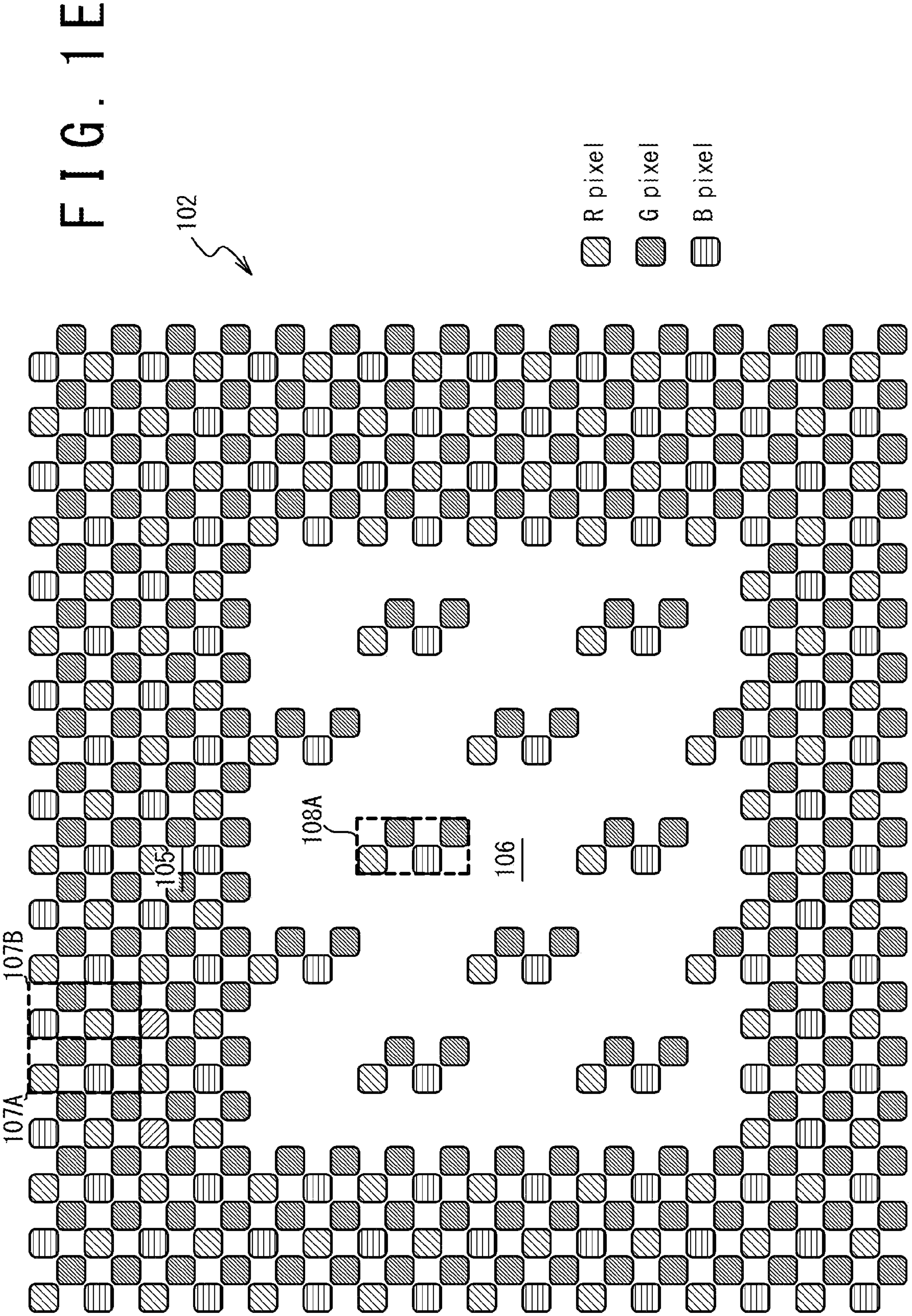
FIG. 1E shows example pixel layouts of first and second areas of the display panel, according to one or more embodiments.

FIG. 1E shows another example of the pixel layouts in the first and second areas 105 and 106 of the display panel 102, according to one or more embodiments. In the shown embodiment, the first area 105 include pixel sets 107A and 107B each including one red (R) pixel, two green (G) pixels, and one blue (B) pixel. The pixel sets 107A and 107B are different in the relative positions of the red and blue pixels with respect to the two green subpixels. The second area 106 includes pixel sets 108A configured identically to the pixel sets 107A. In the shown embodiment, the pixel sets 107A and 107B are disposed adjacent to one another in the first area 105 while the pixel sets 108A are spaced from one another in the second area 106. Accordingly, the pixel density of the second area 106 is lower than the pixel density of the first area 105. In the shown embodiment, the pixel density of the second area 106 is one fourth of the pixel density of the first area 105.

To display a continuous image over the first area 105 and the second area 106 with different pixel layouts, the signal levels (e.g., voltage levels) of data signals used to update the pixels are different between the first area 105 and the second area 106 for the same grey scale value. The difference in the signal levels of the data signals may cause different long-term burn-in profiles. In one or more embodiments, burn-in compensation is performed depending on the areas, i.e., the pixel layouts.

Figure 1F:
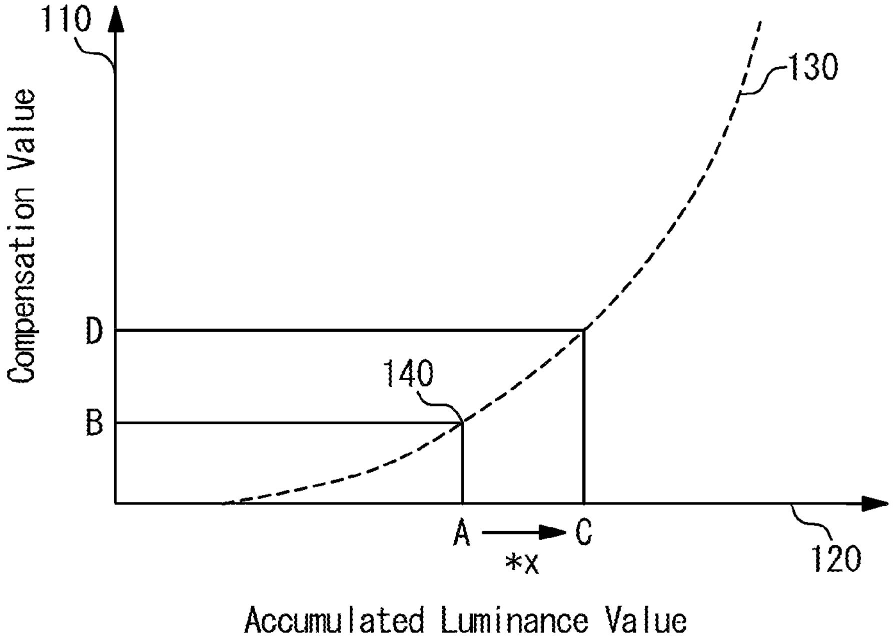
FIG. 1F shows a graph of a compensation value along the y-axis versus an accumulated luminance value along the x-axis, according to one or more embodiments.

FIG. 1F shows a graph of a compensation value along y-axis 110 versus an accumulated luminance value along x-axis 120. In one implementation, the accumulated luminance value of a pixel may be an accumulation of luminance values for the pixel. The luminance values for the pixel may be respectively calculated based on corresponding grey scale values that have been specified for the pixel to update the pixel. The calculated luminance value of a pixel for a given grey scale value may correspond to the luminance of the pixel. In one embodiment, as the accumulated luminance value of a pixel increases in the direction 120, the required compensation value increases in the direction 110. The trendline 130 graphed in this example is for explanatory purposes. In other embodiments, the trendline 130 may have a negative slope, may have a linear relationship, or a different non-linear relationship than the relationship shown in FIG. 1F.

In one embodiment, a system may be configured to compensate for an accumulated luminance value by applying a compensation value. In an example shown at location 140, the accumulated luminance value may be recorded as value A, and the associated compensation value may be value B. In one or more embodiments, a system may receive an accumulated luminance value by accessing a memory element, and may calculate the associated compensation value based on a lookup table. In another embodiment, a system may receive an accumulated luminance value from a register, and may calculate the associated compensation value by applying a calculation based on the shape of trendline 130.

The pair represented by accumulated luminance value A and associated compensation value B may represent compensation applied to pixels in a first area (e.g., the first area 105 shown in FIGS. 1A to 1E) of a display panel. A second area (e.g., the second area 106 shown in FIGS. 1A to 1E) of the display panel may contain pixels which respond to accumulated luminance differently than in the first area. In one embodiment, pixels in the second area may be of a different density and/or composition to accommodate an imaging element (e.g., a camera) under the display panel, including but not limited to a camera. The pixels in the second area may be subjected to stronger luminance drive to produce the same brightness as standard pixels in the first area and may degrade faster than pixels in the first area. A scale factor (or correction factor) x may be applied to pixels in the second area, such that the accumulated luminance value at location A is scaled or adjusted by the scale factor x to yield a scaled accumulated luminance value at location C. This adjusted accumulated luminance value C results in a compensation value of value D. The scale factor x may be based on the pixel layouts of the first area and the second area. In one or more embodiments, the scale factor x is based on the pixel densities of the first area and the second area. In embodiments where the first area has a first pixel density and the second area has a second pixel density, the scale factor may be determined based on the ratio of the first pixel density to the second pixel density.

Figure 2:
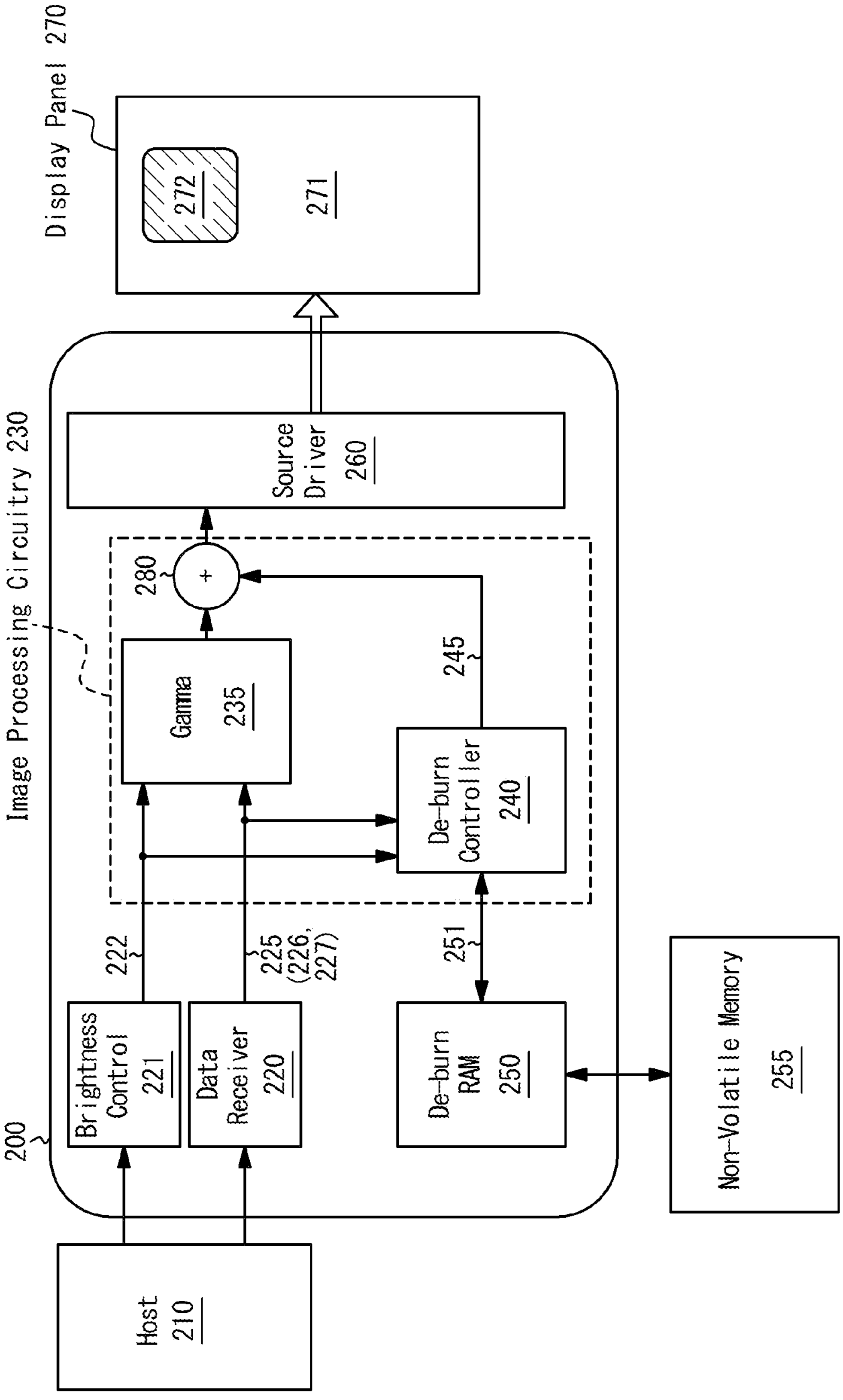
FIG. 2 shows a block diagram of one embodiment of the disclosed system.

FIG. 2 shows a block diagram of one embodiment of the disclosed system. A display driver 200 may be communicatively coupled to a host device 210. The host device 210 may transmit image information to the display driver 200, and the display driver 200 may be configured to update a display panel 270 based on the image information. In one implementation, the display driver 200 may be a display driver integrated circuit (DDIC).

In the shown embodiment, the display panel 270 includes a first area 271 and a second area 272. In the shown embodiment, the first area 271 is an area outside the second area 272. The first area 271 and the second area 272 have different pixel layouts. The first area 271 may be one embodiment of the first area 105 shown in FIGS. 1A to 1E while the second area 272 may be one embodiment of the second area 106 shown in FIGS. 1A to 1E. The second area 272 may be comprised of pixels with a different optical response than pixels in the first area 271. For example, the gamma property of the pixels in the second area 272 may be different from the gamma property of the pixels in the first area 271. The gamma property referred herein is the dependence of the pixel luminance against the grey scale level. The pixels in the second area 272 may be of a different density and/or composition than the pixels in the first area 271 in order to accommodate an under display camera (UDC). The pixels in the second area 272 may be spaced farther apart than the pixels in the first area 271 and the pixel density of the second area 272 may be lower than the pixel density of the first area 271. The pixels in the second area 272 may have a different long-term burn-in profile than the pixels in the first area 271. The pixels in the second area 272 may require larger or smaller compensation values than the pixels in the first area 271.

In the illustrated embodiment, the display driver 200 includes an image data receiver 220, a brightness control block 221, image processing circuitry 230, a de-burn random access memory (RAM) 250, and a source driver 260. The image data receiver 220 is configured to receive image information from the host device 210 and decode received image information into image data 225, which includes raw grey scale values 226 and their associated specific pixel locations 227.

The brightness control block 221 may be configured to receive brightness information from the host device 210 and generate a brightness setting 222 based at least in part on the brightness information. The brightness setting 222 may include a display brightness value (DBV) that specify a desired display brightness level of the display panel 270. The desired display brightness level may be a desired brightness level of the entire image displayed on the display panel 270.

The de-burn RAM 250 is configured to store accumulated luminance values for the respective pixels of the display panel 270. The accumulated luminance value for a pixel may be an accumulation of luminance values that have been determined or calculated for the pixel. The luminance values for the pixel may be calculated based on grey scale values that have been specified for the pixel to update the pixel. The accumulated luminance values may be stored in the de-burn RAM 250 on an individual pixel-by-pixel basis, or may be performed on larger rectilinear regions of a dimension of M×N pixels to save memory bandwidth and size in the de-burn RAM 250, where M and N are integers of two or more. The sizes of the rectilinear regions may be different between the first area 271 and the second area 272.

The image processing circuitry 230 is configured to receive the image data 225 and the brightness setting 222 and process the image data 225 based on the brightness setting 222. In the shown embodiment, the image processing circuitry 230 is configured to apply a burn-in compensation to the image data 225 based at least in part on the accumulated luminance values 251 received from the de-burn RAM 250 to generate compensated luminance values for the respective pixels of the display panel 270.

The source driver 260 is configured to update the pixels of the display panel 270 based at least in part on the corresponding compensated luminance values generated for the pixels. The source driver 260 may be configured to generate data signals for the respective pixels of the display panel 270 such that the data signals have signal levels (e.g., voltage levels) corresponding to the compensated luminance values generated for the respective pixels. The source driver 260 may be further configured to provide the generated data signals to the corresponding pixels and thereby update the respective pixels.

In the shown embodiment, the image processing circuitry 230 includes a gamma correction block 235, a de-burn controller 240, and an adder 280. The gamma correction block 235 is configured to receive the image data 225 and the brightness setting 222 and apply a gamma correction to the image data 225 based on the brightness setting 222 to output gamma-corrected luminance values for the respective pixels of the display panel 270. In embodiments where the brightness setting 222 includes the DBV, the input-output property of the gamma correction block 235 (i.e., the correlation between the raw grey scale values 226 described in the image data 225 and the gamma-corrected luminance values output from the gamma correction block 235) is adjusted based on the DBV to achieve the display brightness level on the display panel 270 as specified by the DBV.

The de-burn controller 240 is configured to retrieve the accumulated luminance values 251 for the respective pixels of the display panel 270 from the de-burn RAM 250 and compute compensation values 245 for the respective pixels based at least in part on the accumulated luminance values 251. In one implementation, the compensation values 245 increase with increase in the corresponding accumulated luminance values 251. The compensation values 245 may be computed based on a look-up table of values, or may be computed based on a stored equation for converting the accumulated luminance values 251 into the compensation values 245. The compensation values 245 for the respective pixels may further depend on the raw grey scale values 226 in the image data 225 for the corresponding pixels. The compensation values 245 thus computed are provided to the adder 280.

The adder 280 is used to apply a burn-in compensation to the gamma-corrected luminance values to generate the compensated luminance values for the respective pixels of the display panel 270. The adder 280 may be configured to apply the compensation values 245, which are determined based on the accumulated luminance values 251, to the gamma-corrected luminance values to generate the compensated luminance values. The compensated luminance values account for the long-term burn-in of individual pixel locations. In one implementation, the adder 280 may be configured to add the compensation values 245 to the corresponding gamma-corrected luminance values to generate the corresponding compensated luminance values for the respective pixels. The compensated luminance values are provided to the source driver 260 and used to generate the data signals with which the respective pixels are updated.

In one or more embodiments, the de-burn controller 240 may be further configured to receive the image data 225 and use the raw grey scale values 226 and the brightness setting 222 to update the accumulated luminance values 251 in the de-burn RAM 250. As pixels are driven with higher luminance values, the accumulated luminance values 251 for those pixels increases and are updated and stored in the de-burn RAM 250. Periodically, the contents of the de-burn RAM 250 may be written to a non-volatile memory 255. Contents of the de-burn RAM 250 may be written to the non-volatile memory 255 as part of a power down sequence of the display driver 200 or part of a timer-based or user-initiated operation to update the contents of the non-volatile memory 255.

In operation, the display system may retrieve the accumulated luminance values 251 from the de-burn RAM 250. The retrieval of the accumulated luminance values 251 may be based on specific pixel locations 227 in the image data 225. The de-burn controller 240 may be configured to generate compensation values 245 based on the retrieved accumulated luminance values 251. Pixel locations in the second area 272 may generate larger compensation values 245 than pixel locations in the first area 271 in order to compensate for pixels in the second area 272 having increased susceptibility to burn-in.

In operation, when the display driver 200 is powered on, contents of the non-volatile memory 255 may be written into the de-burn RAM 250. In this manner, the most recent stored values for the accumulated luminance values 251 may be used in computing the compensation values 245.

Figure 3:
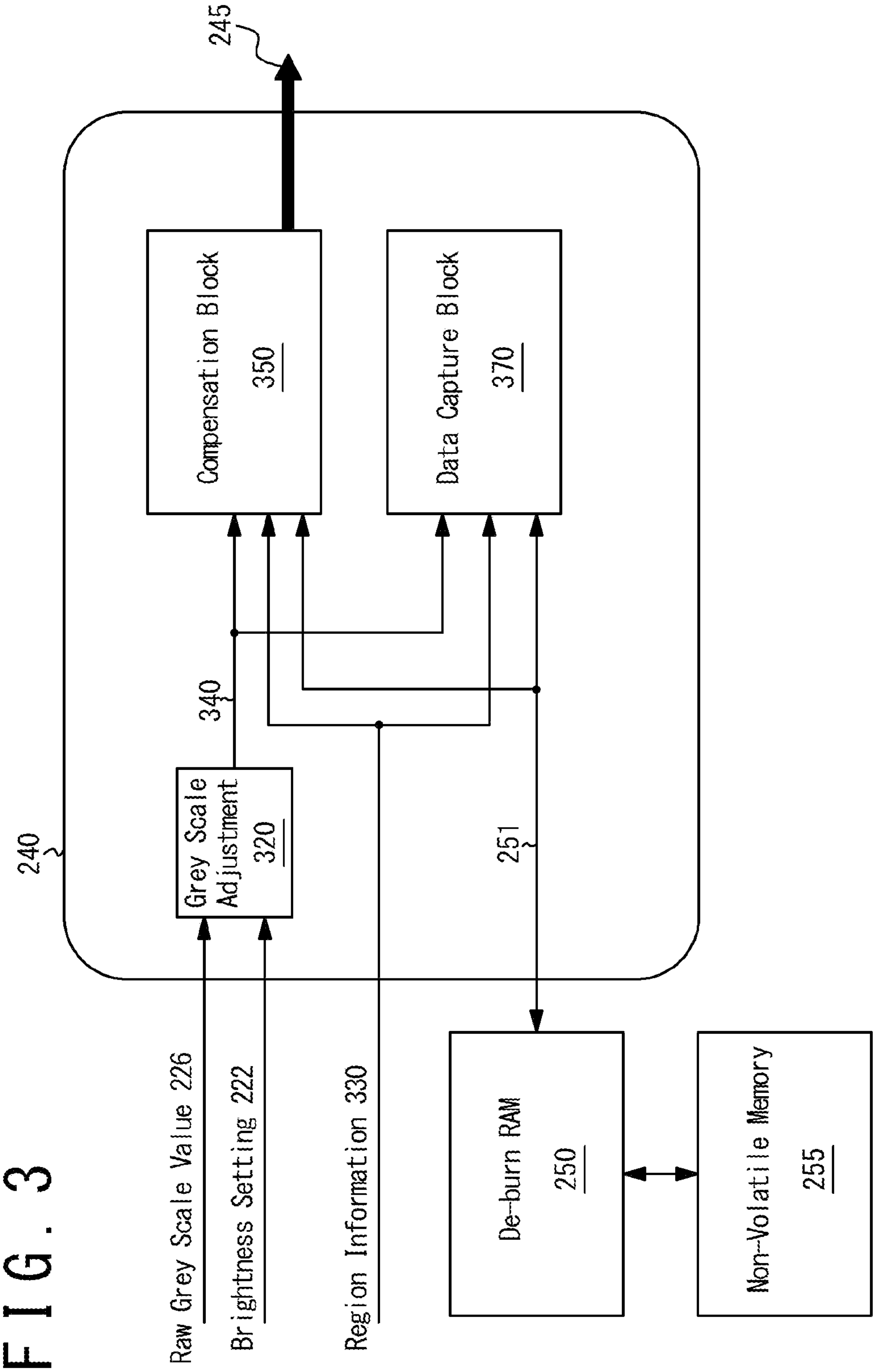
FIG. 3 shows one embodiment of internal details of a de-burn controller.

FIG. 3 shows one embodiment of the internal details of the de-burn controller 240. The de-burn controller 240 may be configured to take or obtain, as input, the raw grey scale values 226 in the image data 225 and the brightness setting 222. The de-burn controller 240 may be further configured to retrieve the accumulated luminance values 251 from the de-burn RAM 250 and generate the compensation values 245 based on the accumulated luminance values 251 and the raw grey scale values 226. The de-burn controller 240 may be further configured to update the accumulated luminance values 251 in the de-burn RAM 250 based on the raw grey scale values 226 and the brightness setting 222. In the shown embodiment, the de-burn controller 240 include a grey scale adjustment block 320, a compensation block 350, and a data capture block 370. Additionally, the de-burn controller 240 may take or obtain region information 330 as input. The region information 330 may indicate that a particular raw grey scale value 226 is associated with a pixel located in the second area 272 of the display panel 270, where the second area 272 exhibits a different long-term burn-in profile than the first area 271.

The grey scale adjustment block 320 may be configured to use the input raw grey scale value 226 and the brightness setting 222 to compute an adjusted grey scale value 340 for each pixel. The adjusted grey scale value 340 may be computed by multiplying the raw grey scale value 226 by an adjustment coefficient determined based on the brightness setting 222, or may be calculated using another arithmetic operation using the raw grey scale value 226 and the brightness setting 222. The calculation of the adjusted grey scale value 340 may include a constant parameter not shown in FIG. 3. The calculation of the adjusted grey scale value 340 may be via a lookup table based on at least one of the raw grey scale value 226 and the brightness setting 222.

Figure 4A:
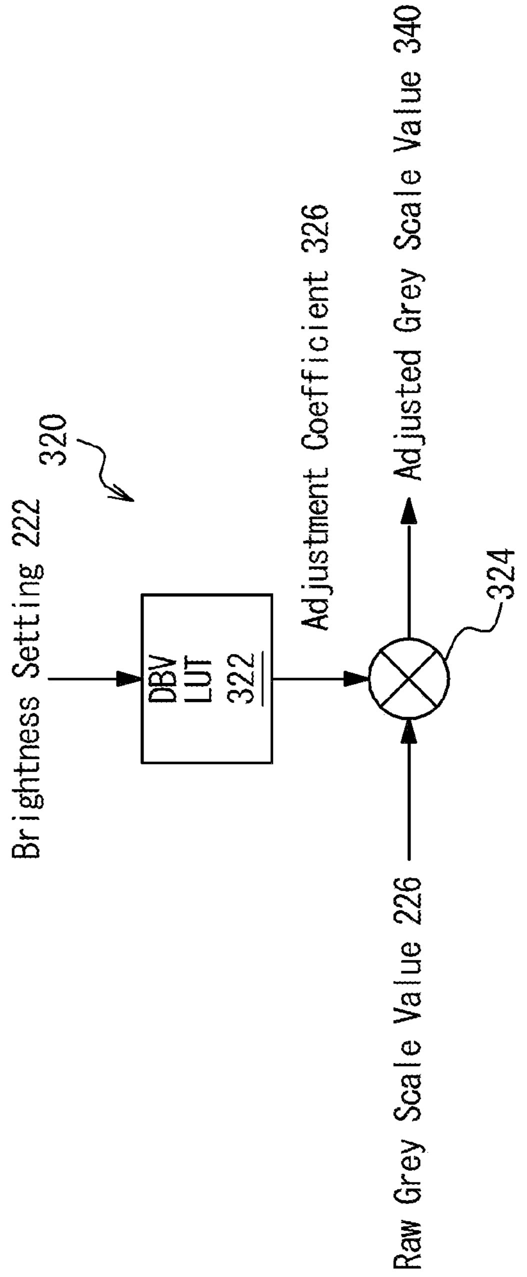
FIG. 4A shows an example configuration of a grey scale adjustment block, according to one or more embodiments.

In embodiments where the brightness setting 222 includes a DBV, the DBV may be used to compute the adjusted grey scale value 340. FIG. 4A shows an example configuration of the grey scale adjustment block 320, according to such embodiments. In the shown embodiment, the grey scale adjustment block 320 includes a DBV lookup table (LUT) 322 and a multiplier 324. The DBV LUT 322 is configured to take or obtain the DBV as input and determine an adjustment coefficient 326 corresponding to the DBV through a table lookup based on the DBV. The multiplier 324 is configured to calculate the adjusted grey scale value 340 by multiplying the raw grey scale value 226 by the adjustment coefficient 326.

Figure 4B:
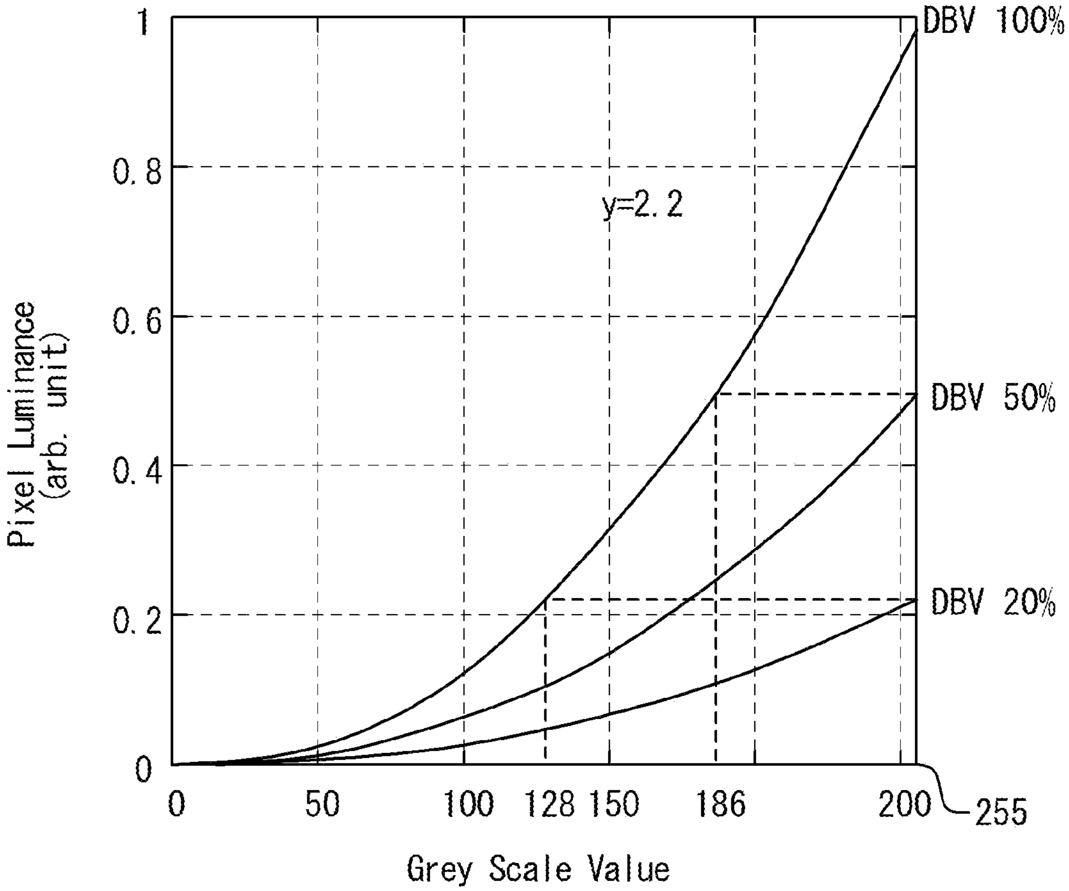
FIG. 4B shows an example relation of a raw grey scale value and an adjusted grey scale value, according to one or more embodiments.

FIG. 4B shows an example relation between the raw grey scale value 226 and the adjusted grey scale value 340, which are linked via the corresponding adjustment coefficient 326, according to one or more embodiments. The adjustment coefficient 326 is determined such that the pixel luminance yielded by the raw grey scale value 226 for the DBV specified by the brightness setting 222 is the same as the pixel luminance yielded by the adjusted grey scale value 340 for the maximum DBV. It is noted that, in the shown embodiment, the DBV is measured as a percentage and the maximum DBV is 100%. In one embodiment, the adjustment coefficient 326 is determined as 0.73 (≅186/255) to yield an adjusted grey scale value 340 of 186 when the raw grey scale value 226 is 255 and the DBV is 50%. In another embodiment, the adjustment coefficient 326 is determined as 0.50 (≅128/255) to yield an adjusted grey scale value 340 of 128 when the raw grey scale value 226 is 255 and the DBV is 20%.

Turning again to FIG. 3, the data capture block 370 is configured to take or obtain as input the adjusted grey scale value 340 and the region information 330. The data capture block 370 is configured to capture the adjusted grey scale value 340 applied to each pixel and update the accumulated luminance value 251 stored in the de-burn RAM 250 for each pixel. In one or more embodiments, the data capture block 370 may be configured to calculate an updated value of the accumulated luminance value 251 applied to each pixel over the life of the display panel 270 based on the adjusted grey scale value 340 and update the accumulated luminance value 251 stored in the de-burn RAM 250 with the calculated update value. The updated accumulated luminance values may be written to the de-burn RAM 250 on every scan of the display panel 270, or the updated values may be written at a predetermined sub-sampled rate to reduce computational overload and bandwidth requirements.

Figure 5:
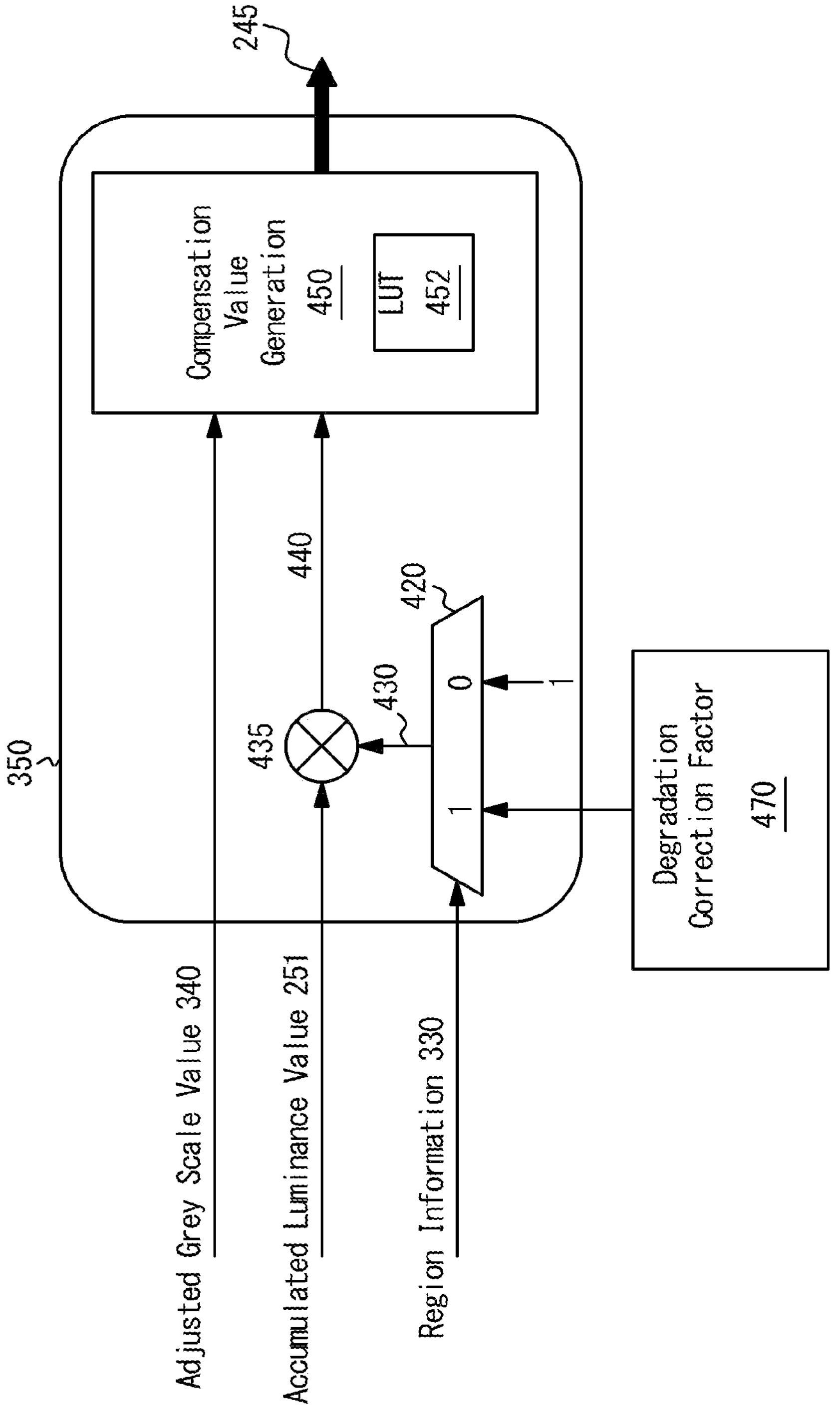
FIG. 5 shows one embodiment of a compensation block.

FIG. 5 shows one embodiment of the compensation block 350. The compensation block 350 may take or obtain the adjusted grey scale values 340 as input. Additionally, the accumulated luminance values 251 from the de-burn RAM 250 may be input to the compensation block 350. Additionally, the region information 330 may be input to the compensation block 350. In the shown embodiment, the compensation block 350 includes a logic circuit 420, a multiplier 435, and a compensation value generation block 450.

In operation, the logic circuit 420 may be configured to take the region information 330 as input and select a scale factor 430. The logic circuit 420 may be a multiplexer, but this should not be interpreted as a limiting example. The logic circuit 420 may be comprised of other logic gates, clocked circuits or memory elements.

In operation, the region information 330 may be set to one polarity indicating an adjustment be made to the accumulated luminance values 251 for the pixels in the second area 272. In one or more embodiments, a positive polarity may select a degradation correction factor 470 as the scale factor 430 for the pixels in the second area 272. The scale factor 430 may be to compensate for accelerated burn-in of the pixels in the second area 272 of display panel 270. The degradation correction factor 470 may be stored in a register or memory element and input to the logic circuit 420. The degradation correction factor 470 may represent long-term degradation information based on a characterization of long-term behavior of the display panel 270. The value of the degradation correction factor 470 may be based on a characterization of the display panel 270 or on modeling of long-term degradation behaviors. The degradation correction factor 470 (i.e., the scale factor 430 for the pixels in the second area 272) is determined based on the pixel densities of the first area 271 and the second area 272. In one implementation, the degradation correction factor 470 is based on the ratio of the pixel density of the first area 271 to the pixel density of the second area 272.

The region information 330 may take an opposite polarity indicating that no adjustment be made to the accumulated luminance value 251 for the pixels in the first area 271. The opposite polarity may select a value of one or unity as the scale factor 430 for the pixels in the first area 271. In other embodiments, the opposite polarity of the region information 330 may result in a constant value greater or less than one selected as the scale factor 430.

The scale factor 430 is provided to the multiplier 435. The multiplier 435 is configured to multiply the accumulated luminance value 251 by the scale factor 430 for each pixel to generate an adjusted accumulated luminance value 440 for each pixel. The adjusted accumulated luminance values 440 for the pixels in the first area 271 are identical to the accumulated luminance values 251 while the adjusted accumulated luminance values 440 for the pixels in the second area 272 are scaled accumulated luminance values obtained by scaling the accumulated luminance values 251 with the degradation correction factor 470, which is selected as the scale factor 430.

The compensation value generation block 450 is configured to take or obtain, as inputs, the adjusted grey scale value 340 and the adjusted accumulated luminance value 440 for each pixel. The compensation value generation block 450 is further configured to output a compensation value 245 based at least in part on the adjusted grey scale value 340 and the adjusted accumulated luminance value 440 for each pixel. The compensation value generation block 450 may be configured to output the compensation value 245 based on a relationship between compensation values and accumulated luminance values as shown in FIG. 1F. For each pixel in the first area 271, for which the scale factor 430 is one or unity, the compensation value generation block 450 takes as input an accumulated luminance value 251 and outputs a compensation value 245 corresponding to the accumulated luminance value 251. For each pixel in the second area 272, due to the functions of the logic circuit 420 and the multiplier 435, the compensation value generation block 450 takes as input a scaled accumulated luminance value obtained by scaling the accumulated luminance value 251 with the degradation correction factor 470 and outputs a compensation value 245 corresponding to the scaled accumulated luminance value. In one implementation, the compensation value generation block 450 includes an LUT 452 that describes an input-to-output property of the compensation value generation block 450. The input-to-output property may represent the relation between the adjusted accumulated luminance value 440 and the compensation value 245 (e.g., as shown in FIG. 1F). The compensation value generation block 450 may be configured to generate the compensation value 245 through a table lookup of the LUT 452 using the adjusted accumulated luminance value 440 as index.

Figure 6:
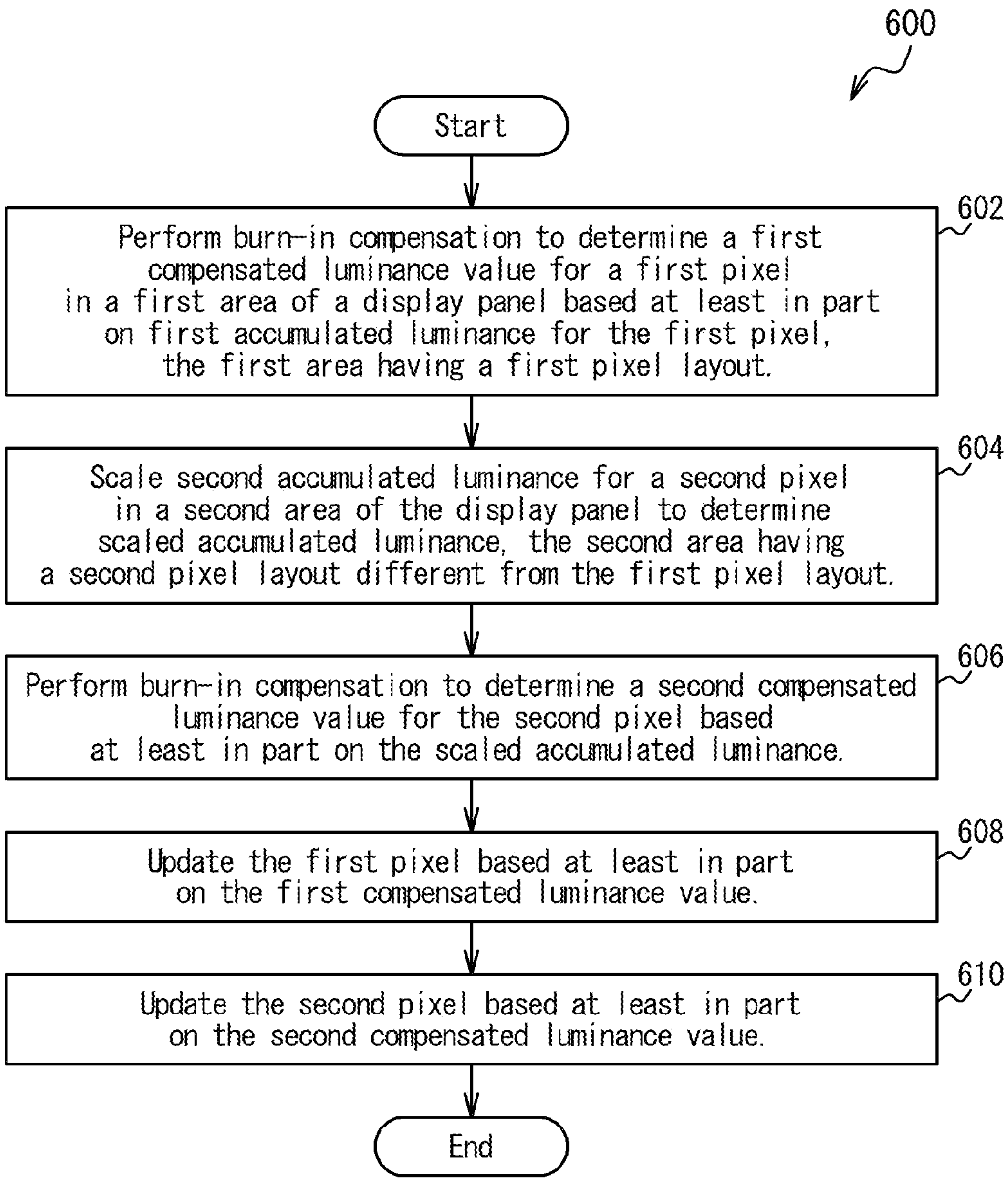
FIG. 6 shows an example method for driving a display panel, according to one or more embodiments.

FIG. 6 shows a flowchart depicting an example method 600, according to one or more embodiments. While the various steps in the flowchart are presented and described sequentially, one of ordinary skill will appreciate that some or all of the steps may be executed in different orders, may be combined or omitted, and some or all of the steps may be executed in parallel. Additional steps may further be performed. Accordingly, the scope of the disclosure should not be considered limited to the specific arrangement of steps shown in FIG. 6.

In one or more embodiments, the method 600 is a method for driving a display panel (e.g., the display panels 102 shown in FIGS. 1A to 1E and FIG. 2) with a first area (e.g., the first areas 105 and 271 shown in FIGS. 1A to 1C, 1E, and 2) and a second area (e.g., the second areas 106 and 272 shown in FIGS. 1A, 1B, 1D, 1E, and 2). The first area has a first pixel layout and the second area has a second pixel layout different from the first pixel layout. The first area and the second area may have different pixel densities. In some implementation, the pixel density of the second area may be lower than the pixel density of the first area and the second area may be used as an under display camera (UDC) area behind which a camera is disposed. The lower pixel density of the second area may facilitate a capture of an image through the second area.

The method 600 includes performing a burn-in compensation to determine a first compensated luminance value for a first pixel in the first area of the display panel based at least in part on a first accumulated luminance value for the first pixel at step 602. The first accumulated luminance value for the first pixel may be an accumulation of luminance values for the first pixel. The luminance values for the first pixel may be respectively calculated based on corresponding grey scale values that have been specified for the first pixel to update the first pixel. In one embodiment, the burn-in compensation for the first pixel involves determining a first compensation value for the first accumulated luminance value based on a relationship between the compensation value and the accumulated luminance value shown in FIG. 1F and using the first compensation value to determine the first compensated luminance value for the first pixel.

The method 600 further includes scaling a second accumulated luminance value for a second pixel in the second area of the display panel to determine a scaled accumulated luminance value at step 604. The second accumulated luminance value for the second pixel may be an accumulation of luminance values for the second pixel. The luminance values for the second pixel may be respectively calculated based on corresponding grey scale values that have been specified for the second pixel to update the second pixel. The scaling of the second accumulated luminance value may be based on pixel densities of the first area and the second area. In one or more embodiments, the first area has a first pixel density and the second area has a second pixel density. In such embodiments, the second accumulated luminance value may be scaled with a scale factor determined based on a ratio of the first pixel density to the second pixel density.

The method 600 further includes performing a burn-in compensation to determine a second compensated luminance value for the second pixel based at least in part on the scaled accumulated luminance value at step 606. In one embodiment, the burn-in compensation for the second pixel involves determining a second compensation value for the scaled accumulated luminance value based on a relationship between the compensation value and the accumulated luminance value shown in FIG. 1F and using the second compensation value to determine the second compensated luminance value for the second pixel.

The method 600 further includes updating the first pixel based at least in part on the first compensated luminance value at step 608 and updating the second pixel based at least in part on the second compensated luminance value at step 610.

While many embodiments have been described, those skilled in the art, having benefit of this disclosure, will appreciate that other embodiments can be devised which do not depart from the scope. Accordingly, the scope of the invention should be limited only by the attached claims.

What is claimed is:

1. A display driver, comprising:
image processing circuitry configured to:
perform a burn-in compensation to determine a first compensated luminance value for a first pixel in a first area of a display panel based at least in part on a first accumulated luminance value for the first pixel, the first area having a first pixel layout,
scale a second accumulated luminance value for a second pixel in a second area of the display panel to determine a scaled accumulated luminance value, the second area having a second pixel layout different from the first pixel layout, and
perform a burn-in compensation to determine a second compensated luminance value for the second pixel based at least in part on the scaled accumulated luminance value; and
a source driver configured to:
update the first pixel based at least in part on the first compensated luminance value, and
update the second pixel based at least in part on the second compensated luminance value.

2. The display driver of claim 1, wherein scaling the second accumulated luminance value is based on pixel densities of the first area and the second area.

3. The display driver of claim 1, wherein the first area has a first pixel density,
wherein the second area has a second pixel density, and
wherein scaling the second accumulated luminance value comprises scaling the second accumulated luminance value with a scale factor determined based on a ratio of the first pixel density to the second pixel density.

4. The display driver of claim 1, wherein the second area comprises an under display camera (UDC) area behind which a camera is disposed to capture an image through the UDC area.

5. The display driver of claim 1, wherein the image processing circuitry comprises a compensation value generation block configured to:
obtain, as input, the first accumulated luminance value to output a first compensation value corresponding to the first accumulated luminance value, and
obtain, as input, the scaled accumulated luminance value to output a second compensation value corresponding to the scaled accumulated luminance value, and
wherein determining the first compensated luminance value is based at least in part on the first compensation value, and
wherein determining the second compensated luminance value is based at least in part on the second compensation value.

6. The display driver of claim 5, wherein the compensation value generation block comprises a lookup table that describes an input-to-output property of the compensation value generation block.

7. The display driver of claim 1, wherein the image processing circuitry comprises a gamma correction block configured to:
output a first gamma-corrected luminance value based at least in part on a first grey scale value for the first pixel, and
output a second gamma-corrected luminance value based at least in part on a second grey scale value for the second pixel,
wherein determining the first compensated luminance value for the first pixel comprises performing the burn-in compensation to the first gamma-corrected luminance value based at least in part on the first accumulated luminance value, and
wherein determining the second compensated luminance value for the second pixel comprises performing the burn-in compensation to the second gamma-corrected luminance value based at least in part on the second accumulated luminance value.

8. The display driver of claim 1, wherein the image processing circuitry is further configured to:
update the first accumulated luminance value based at least in part on a first grey scale value for the first pixel, and
update the second accumulated luminance value based at least in part on a second grey scale value for the second pixel.

9. A display device, comprising:
a display panel comprising:
a first area with a first pixel layout; and
a second area with a second pixel layout different from the first pixel layout; and
a display driver configured to:
perform a burn-in compensation to determine a first compensated luminance value for a first pixel in the first area of the display panel based at least in part on a first accumulated luminance value for the first pixel,
scale a second accumulated luminance value for a second pixel in the second area of the display panel to determine a scaled accumulated luminance value, and
perform a burn-in compensation to determine a second compensated luminance value for the second pixel based at least in part on the scaled accumulated luminance value,
update the first pixel based at least in part on the first compensated luminance value, and
update the second pixel based at least in part on the second compensated luminance value.

10. The display device of claim 9, wherein scaling the second accumulated luminance value is based on pixel densities of the first area and the second area.

11. The display device of claim 9, wherein the first area has a first pixel density,
wherein the second area has a second pixel density, and
wherein scaling the second accumulated luminance value comprises scaling the second accumulated luminance value with a scale factor determined based on a ratio of the first pixel density to the second pixel density.

12. The display device of claim 9, wherein the second area comprises an under display camera (UDC) area behind which a camera is disposed to capture an image through the UDC area.

13. The display device of claim 9, wherein the display driver comprises a compensation value generation block configured to:
obtain, as input, the first accumulated luminance value to output a first compensation value corresponding to the first accumulated luminance value, and
obtain, as input, the scaled accumulated luminance value to output a second compensation value corresponding to the scaled accumulated luminance value, and
wherein determining the first compensated luminance value is based at least in part on the first compensation value, and
wherein determining the second compensated luminance value is based at least in part on the second compensation value.

14. The display device of claim 13, wherein the compensation value generation block comprises a lookup table that describes an input-to-output property of the compensation value generation block.

15. The display device of claim 9, wherein the display driver is further configured to:
output a first gamma-corrected luminance value based at least in part on a first grey scale value for the first pixel, and
output a second gamma-corrected luminance value based at least in part on a second grey scale value for the second pixel,
wherein determining the first compensated luminance value for the first pixel comprises performing the burn-in compensation to the first gamma-corrected luminance value based at least in part on the first accumulated luminance value, and
wherein determining the second compensated luminance value for the second pixel comprises performing the burn-in compensation to the second gamma-corrected luminance value based at least in part on the second accumulated luminance value.

16. The display device of claim 9, wherein the display driver is further configured to:
update the first accumulated luminance value based at least in part on a first grey scale value for the first pixel, and
update the second accumulated luminance value based at least in part on a second grey scale value for the second pixel.

17. A method, comprising:

performing a burn-in compensation to determine a first compensated luminance value for a first pixel in a first area of a display panel based at least in part on a first accumulated luminance value for the first pixel, the first area having a first pixel layout;

scaling a second accumulated luminance value for a second pixel in a second area of the display panel to determine a scaled accumulated luminance value, the second area having a second pixel layout different from the first pixel layout;

performing a burn-in compensation to determine a second compensated luminance value for the second pixel based at least in part on the scaled accumulated luminance value;

updating the first pixel based at least in part on the first compensated luminance value; and updating the second pixel based at least in part on the second compensated luminance value.

18. The method of claim 17, wherein scaling the second accumulated luminance value is based on pixel densities of the first area and the second area.

19. The method of claim 17, wherein the first area has a first pixel density, wherein the second area has a second pixel density, and wherein scaling the second accumulated luminance value comprises scaling the second accumulated luminance value with a scale factor determined based on a ratio of the first pixel density to the second pixel density.

20. The method of claim 17, further comprising:

obtaining, as input by a compensation value generation block, the first accumulated luminance value to output a first compensation value corresponding to the first accumulated luminance value, and obtaining, as input by the compensation value generation block, the scaled accumulated luminance value to output a second compensation value corresponding to the scaled accumulated luminance value, wherein determining the first compensated luminance value is based at least in part on the first compensation value, and wherein determining the second compensated luminance value is based at least in part on the second compensation value.

* * * * *